US008353018B2

(12) United States Patent
McMillan et al.

(10) Patent No.: US 8,353,018 B2
(45) Date of Patent: Jan. 8, 2013

(54) AUTOMATIC LOCAL LISTING OWNER AUTHENTICATION SYSTEM

(75) Inventors: Owen McMillan, Toronto (CA); Ambles Kwok, Richmond Hill (CA)

(73) Assignee: Yahoo! Inc., Sunnyvale, CA (US)

( * ) Notice: Subject to any disclaimer, the term of this patent is extended or adjusted under 35 U.S.C. 154(b) by 1091 days.

(21) Appl. No.: 12/270,528

(22) Filed: Nov. 13, 2008

(65) Prior Publication Data

US 2010/0122330 A1 May 13, 2010

(51) Int. Cl.
*H04L 29/06* (2006.01)
*H04L 9/28* (2006.01)
*H04L 9/32* (2006.01)

(52) U.S. Cl. .............. 726/6; 726/1; 726/7; 713/179; 705/75

(58) Field of Classification Search .................. None
See application file for complete search history.

(56) References Cited

U.S. PATENT DOCUMENTS

| | | | | |
|---|---|---|---|---|
| 5,584,005 A * | 12/1996 | Miyaoku et al. | ............... | 711/206 |
| 6,505,238 B1 * | 1/2003 | Tran | ............... | 709/208 |
| 6,941,285 B2 * | 9/2005 | Sarcanin | ............... | 705/67 |
| 6,957,229 B1 | 10/2005 | Dyor | | |
| 7,228,417 B2 * | 6/2007 | Roskind | ............... | 713/168 |
| 7,564,962 B1 * | 7/2009 | O'Keeffe et al. | ............... | 379/265.09 |
| 2001/0011275 A1 | 8/2001 | Lin et al. | | |
| 2002/0116525 A1 | 8/2002 | Peters et al. | | |
| 2003/0041114 A1 * | 2/2003 | Murakami et al. | ............... | 709/206 |
| 2004/0168066 A1 | 8/2004 | Alden | | |
| 2005/0021494 A1 | 1/2005 | Wilkinson | | |
| 2005/0043964 A1 * | 2/2005 | Thielscher et al. | ............... | 705/2 |
| 2005/0097046 A1 | 5/2005 | Singfield | | |
| 2005/0182660 A1 * | 8/2005 | Henley | ............... | 705/2 |
| 2006/0041554 A1 | 2/2006 | Svendsen et al. | | |
| 2006/0053112 A1 | 3/2006 | Chitkara et al. | | |
| 2006/0074913 A1 | 4/2006 | O'Sullivan et al. | | |
| 2006/0117010 A1 | 6/2006 | Hakala | | |
| 2006/0136419 A1 | 6/2006 | Brydon et al. | | |
| 2006/0149739 A1 | 7/2006 | Myers | | |
| 2006/0182249 A1 * | 8/2006 | Archambault et al. | .. | 379/202.01 |
| 2007/0169181 A1 * | 7/2007 | Roskind | ............... | 726/5 |
| 2007/0219817 A1 * | 9/2007 | Wu | ............... | 705/1 |

(Continued)

OTHER PUBLICATIONS

Karro, Jared et al., "Protecting Web Servers from Security Holes in Server-Side includes", Division of Computer Science, University of North Carolina at Greensboro, 1998; pp. 1-9.

(Continued)

*Primary Examiner* — Christopher Revak
(74) *Attorney, Agent, or Firm* — Hickman Palermo Truong Becker Bingham Wong LLP

(57) ABSTRACT

A method and apparatus for verifying that a user is the owner of a public listing is provided. The user selects an option to claim ownership of the public listing offered by an online service provider. The online service provider uses information regarding the user and the public listing to generate a verification code. The online service provider delivers the verification code to the owner of the public listing via the contact information provided by the public listing. If the user owns the public listing, the user receives the verification code via contact information associated with the public listing. The user verifies ownership by inputting a code to the online service provider. If the inputted code matches the verification code, then the online service provider identifies the user as the owner of the listing. Once verified, the user modifies the listing.

28 Claims, 8 Drawing Sheets

U.S. PATENT DOCUMENTS

| | | | |
|---|---|---|---|
| 2008/0021904 A1 | 1/2008 | Garg et al. | |
| 2008/0263631 A1* | 10/2008 | Wang et al. | 726/2 |
| 2008/0270596 A1* | 10/2008 | Wahl | 709/224 |
| 2008/0301057 A1* | 12/2008 | Oren | 705/71 |
| 2010/0251347 A1* | 9/2010 | Roskind | 726/5 |
| 2010/0325561 A1* | 12/2010 | Archambault et al. | 715/753 |
| 2011/0022479 A1* | 1/2011 | Henley | 705/14.73 |
| 2011/0300841 A1* | 12/2011 | Archambault et al. | 455/416 |
| 2012/0039452 A1* | 2/2012 | Horn et al. | 379/188 |

OTHER PUBLICATIONS

Internet website: http://gogglewebmastercentral.blogspot.com/2009/10/changes-to-website-verification-in.html (12 pages).

WHITEPAGES.COM, "Business Search," 1 page.

Yahoo!, "How do I verify my alternate email address? Yahoo! Sign-in and Registration Help," http://help.yahoo.com/l/yahoo/edit/alternate_email/edit-29.html, data retrieved on Oct. 2, 2008, 1 page.

Yahoo!, "Random Deposit Verification—Yahoo! Small Business Help," http://help.yahoo.com/l/us/yahoo/smallbusiness/store/order/paypal/paypal-06.html, data retrieved on Sep. 18, 2008, 1 page.

WHITEPAGES.COM, "(Results 1-1 of 1) ~ hickman Palermo ~ Simple Search—Perform business searches on . . . ," http://yellowpages.superpages.com/listings.jsp?sid=12213&S=&search=Find+It&&PG=L . . . , data retrieved on Oct. 9, 2008, 1 page.

SUPERPAGES.COM, "Online Advertising: Superpages Small Business Online Advertising," https://advertising.superpages.com/spportal/spportalFlow.do?_flowExecutionKey=_cE5A9 . . . , data retrieved on Oct. 9, 2008, 2 pages.

United States Postal Service, "Identity Verification," https://moversguide.usps.com/icoa/flow.do?_flowExecutionKey=_cCOD10E62-CD63-2B..., data retrieved on Sep. 18, 2008, 1 page.

U.S. Appl. No. 11/491,309, filed Jul. 21, 2006, Advisory Action, Feb. 26, 2009.

* cited by examiner

AUTOMATIC LOCAL LISTING OWNER AUTHENTICATION SYSTEM

FIELD OF THE INVENTION

The present invention relates to verifying a user as the owner of a public listing.

BACKGROUND

Business Listing Services

Local exchange carriers, or local phone companies, provide telecommunications services to businesses and individuals. Local phone companies publish directories from customer lists. The directories include a name and contact information for each customer. The contact information could include an address and phone number, just an address, or just a phone number. Often, the directories include customer lists from several local phone companies combined, and these directories are sometimes compiled by third parties.

Individual contact information is normally published in what are commonly known as the white pages. For privacy reasons, an individual may request that his or her phone company not publish his or her name and contact information. Conversely, an individual may ask other phone companies to publish his or her listing in their directories. Published listings are also called public listings.

Business directories are commonly known as the yellow pages. A business may request that the business's phone company not publish the business's name and contact information. More commonly, though, a business will try to gain exposure to customers by ensuring that the business's listing is in as many directories as possible. For example, a business owner using one local phone company may contact another local phone company to ensure that the business's listing appears in the other local phone company's directory. Customers searching for the business could then find the business in the directories of both phone companies.

Directory publishers, such as local phone companies and third party providers, earn money by allowing businesses to advertise in directories. A directory publisher may, for example, allow a business to list the business name on an enlarged section of a page in the yellow pages. The directory publisher may provide other options, too, such as bolding the business name or coloring the business name.

Online service providers such as Yahoo! Inc. make listings available online through Web interfaces, allowing users to perform advanced searches for individuals and businesses. The online service providers receive the listings from local phone companies and directory publishers. The online service providers store the listings in an electronic format, generally on a searchable database, on servers capable of handling high volumes of network traffic. Through online service providers, members of the general public gain high-speed access to all of the listings stored on the servers. Online service providers can also use external data sources that store the listings.

An online service provider may receive contact information about a business or individual from the directory publisher. For example, the online service provider receives contact information about John Smith of XYZ St. in San Jose, Calif. with the phone number of (555) 555-5555. The online service provider stores the information about John Smith and creates a listing for John Smith. The listing might appear as follows:

John Smith
XYZ St.
San Jose, California
(555) 555-5555

When a user searches for "John Smith" in San Jose, Calif., the user could be directed to the listing above. The user could then contact John Smith using the information provided.

Much like directory publishers, online service providers earn money through business advertisements. An online service provider may charge business owners in exchange for an increase in business exposure on the Web site. Some ways to increase business exposure are, as in paper directories, to increase the listing size, bolden the font, add information, or otherwise modify the listing.

To modify a listing on a listing Web site, a representative of the business normally navigates to the Web site, finds his or her business listing, and clicks on a button that allows one to modify the business listing. If an online service provider charges for the particular modifications, the representative pays with a credit card to complete the transaction. The online service provider charges the credit card with either a one-time fee or a recurring fee, and the modifications to the business listing normally become effective upon payment.

To ensure that listings are accurate, online service providers sometimes require the representative to agree to terms of an online agreement. The terms indicate that the representative declares to have the authority to make decisions on behalf of the company. If the representative checks a checkbox or clicks a button agreeing to the terms, then the representative can pay for additional advertisements and change the listing. Some online service providers may merely require the representative to pay, without a statement that he or she has authority to modify the listing.

A problem arises when a visitor to the Web site claims to have authority to make changes to the listing, but he or she does not actually have such authority. The problem is compounded by the fact that online service providers routinely allow changes to be made to standard listings even without charging a fee. Also, modifications are effective immediately without editorial review. A visitor claiming to have authority to make changes to a listing would be allowed to modify the listing in ways that may harm the company's reputation or divert customers, and such unauthorized changes can make the online service provider's listings unreliable. The unreliability of listings can reflect poorly on both the online service provider and the company. Consumers can be easily misled or frustrated by incorrect information.

Only recently have online service providers been allowing users to make changes to the listings through Web access. Currently, online service providers have no way of ensuring the validity of modifications to the listings.

Email Account Verification Via Email

Online service providers may offer a wide variety of services on the Internet. Some online service providers offer user accounts that allow services to be user-specific. Some services offered by online service providers require that a user has a user account and an email account associated with the user account. An email account may be required so that the provider can contact the user on a regular basis to inform the user of issues involving the user account.

When the user adds an email account to a user account, the provider of the account may want to verify that the user actually has access to the email account. To verify an email account, the provider could send an email to the provided email account with a code. If the user does not have access to the email account, then the user would not receive the code. Therefore, if the provider asks the user for the code, then the provider can verify that the user accessed the email account to retrieve the code.

When asked for an email account, the user could either create an email account used specifically for receiving the code, or send the code to an existing email account. Email accounts are easy and free to create through a wide variety of online service providers. Accordingly, a user aware of the email verification procedure can select an email account that is verifiable but not often used, thereby thwarting the provider's goal to verify that an email account with which to contact the user regarding his user account. Moreover, the user could easily delete the email account after the email account has been verified.

For example, a user could add the email account, temp@yahoo.com, to his or her user account by creating the email account "temp" on Yahoo! Inc.'s Web site. The user could use the email account to gain access to a service on X's Web site, where X is an online service provider. X would send an email containing a verification code to temp@yahoo.com. The user would check his or her inbox of his temp Yahoo! Inc. Web site account. Then, the user could verify his temp@yahoo.com email account by entering the code on X's Web site. Unfortunately for X, the user can then delete his Yahoo! Inc. email account so that the user does not receive any email notifications regarding his user account on X.

Because of the ease with which users can create, modify, and delete email accounts, the online service provider learns very little about the user through email account verification. Using an email account also requires that the code be stored electronically on the recipient's email account and on a server of the online service provider. If the email account is not very secure, then the code may be compromised when sent to the email account. A further security risk associated with email is that an email message is sometimes viewed unintentionally. Often, no physical barriers exist between an unintended recipient and a code viewable in the body of the email.

Bank Account Verification Via Deposit

PayPal is a unique online service provider that allows bank account verification. PayPal allows a user to create a user account and associate a bank account with the user account. In order to ensure that the user has access to the bank account, PayPal makes a small random deposit into the account and asks the user to verify the amount deposited. When the user sends PayPal the amount deposited, PayPal knows the user accessed his bank account and read a statement that included the deposit. Once the account has been verified, the user then funds his PayPal account based on his bank account information.

Similar to the email account verification method, the bank account verification method allows the user to select a bank account to use for verification. The user may use a poorly funded bank account or open up a new bank account, so long as the user has access to statements from the bank account. After the user verifies the bank account to the online service provider, the user can close the bank account or remove funds from the bank account.

If the user does not have access to a bank account, then the user can attempt to guess the small random deposit amount made to the account. The online service provider only has so many small amounts to choose from, and a code limited to small numbers of dollars and cents cannot be a very secure code. If the user is successful at guessing the amount, then the user could use his user account on the online service provider to make withdrawals from the bank account.

Because PayPal generates the deposit amount randomly, PayPal is required to store the amount deposited so that the amount deposited can be compared to the amount the user claims was deposited. A random number cannot be regenerated. Because the PayPal method requires the deposit amount to be stored, the method is susceptible to security breaches where records containing deposit amounts find their way to the public.

The bank account method digs into the pocketbook of the online service provider. The bank account method requires the online service provider to pay for the small random deposit to the bank account. As the number of small random deposits grows, the total amount of funds required for bank account verification can be disabling. Further, if the maximum deposit amount is too small, then the code is not secure at all. The code is more secure when higher deposit amounts are made, creating a situation requiring the online service provider to pay more for a secure code.

Private Account Information Generally

In sum, private account information verification allows the user to generate the information to be verified by the online service provider. For example, the user can create an email account or open a bank account in order to have the account information verified.

Moreover, the information to be verified is private and not public. Tables of names with email addresses or names with bank accounts are only published if there has already been a major breach in information security. Unlike verifying private information, verifying public information poses additional security concerns due to the fact that everyone has access to the core of information to be verified.

Also, private account information verification may require the code to fit within certain parameters, such as a number of cents. Limiting the variability of the code makes the code easier to guess and less secure.

The code needs to be stored so that the code can be used during verification. Storing the code creates a potential for security breaches. Also, storing the code creates a need to find the code during verification. If the code is stored on server A, then server B would need to find out which server contains the code, and communicate with server A to retrieve the code. The communication of the code between servers creates another potential security concern.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A method is described for verifying that a user is the owner of a public listing that is listed by an online service provider. Public listings are displayed to the user via a Web site provided by the online service provider. For a public listing, the user selects an option to claim ownership. The online service provider uses information regarding the user and the public listing to generate a verification code. The online service provider delivers the verification code to the owner of the public listing via the contact information provided by the public listing. If the user owns the public listing, then the user receives the verification code via contact information associated with the public listing.

The user can then verify ownership by sending the verification code to the online service provider via the Web site. To send the verification code to the online service provider, the user reads the verification code and inputs a code into the Web site. The online service provider can either use a stored version of the verification code or generate a second verification code in the same manner that the verification code was generated. If the inputted code from the user matches the stored version of the verification code or the second verification code, then the online service provider identifies the user as the owner of the listing. The user can then modify the listing. If the user is not the owner of the listing, then the user would not receive the verification code from the online service provider. Thus, the non-owner user would not be able to input the code matching the verification code or the second verification code because the verification code would not be delivered to him or her.

Online Listings

Figure 1:
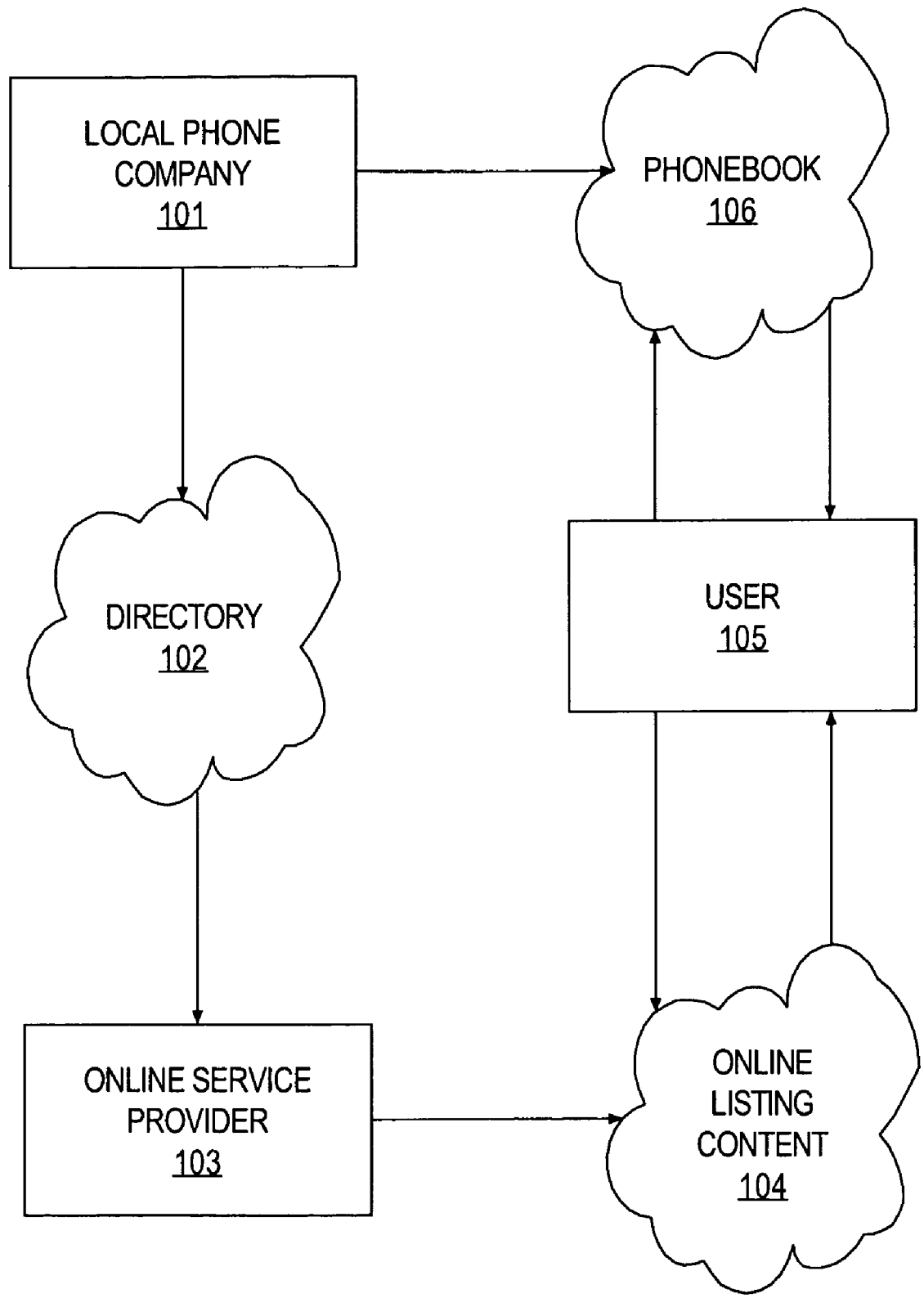
FIG. 1 is a diagram illustrating a system by which a local phone company and an online service provider provide customer information to a user.

Referring to FIG. 1, a local phone company 101 or directory publisher provides a directory 102 to an online service provider 103. Online service provider 103 stores customer contact information from directory 102 in an electronic form, such as a searchable database. The electronic form of the customer contact information is made available as online listing content 104 to a user 105 or users.

User 105 may type in a keyword that matches one of the words from the customer contact information. In response, online service provider 103 shows user 105 a listing 104 of a customer's contact information that matches the keyword. For example, if user 105 types, "McDonald's," user 105 is directed to local McDonald's restaurants. Alternately, user 105 could type in a keyword that matches a category under which a customer's contact information is categorized. For example, several customers of local phone company 101 may be categorized as restaurants. If the user types in "restaurant," online service provider 103 could show the user information about McDonald's, which represents a restaurant that is a customer of local phone companies in just about every region of the United States.

Local phone company 101 also distributes a phone book 106 of customer contact information. Phone book 106 is distributed to most, if not all, addresses in the region. User 105 or users of the phone book physically search for listings by flipping through the pages of phone book 106.

Option to Verify Ownership

In one embodiment, when an online service provider shows the user one of the searchable listings online, the online service provider also gives the user an option for the user to claim ownership of the listing. In one embodiment, the option takes the form of a checkbox. In another embodiment, the option is presented with a button or any other structure that allows the user to make a selection.

Figure 2A:
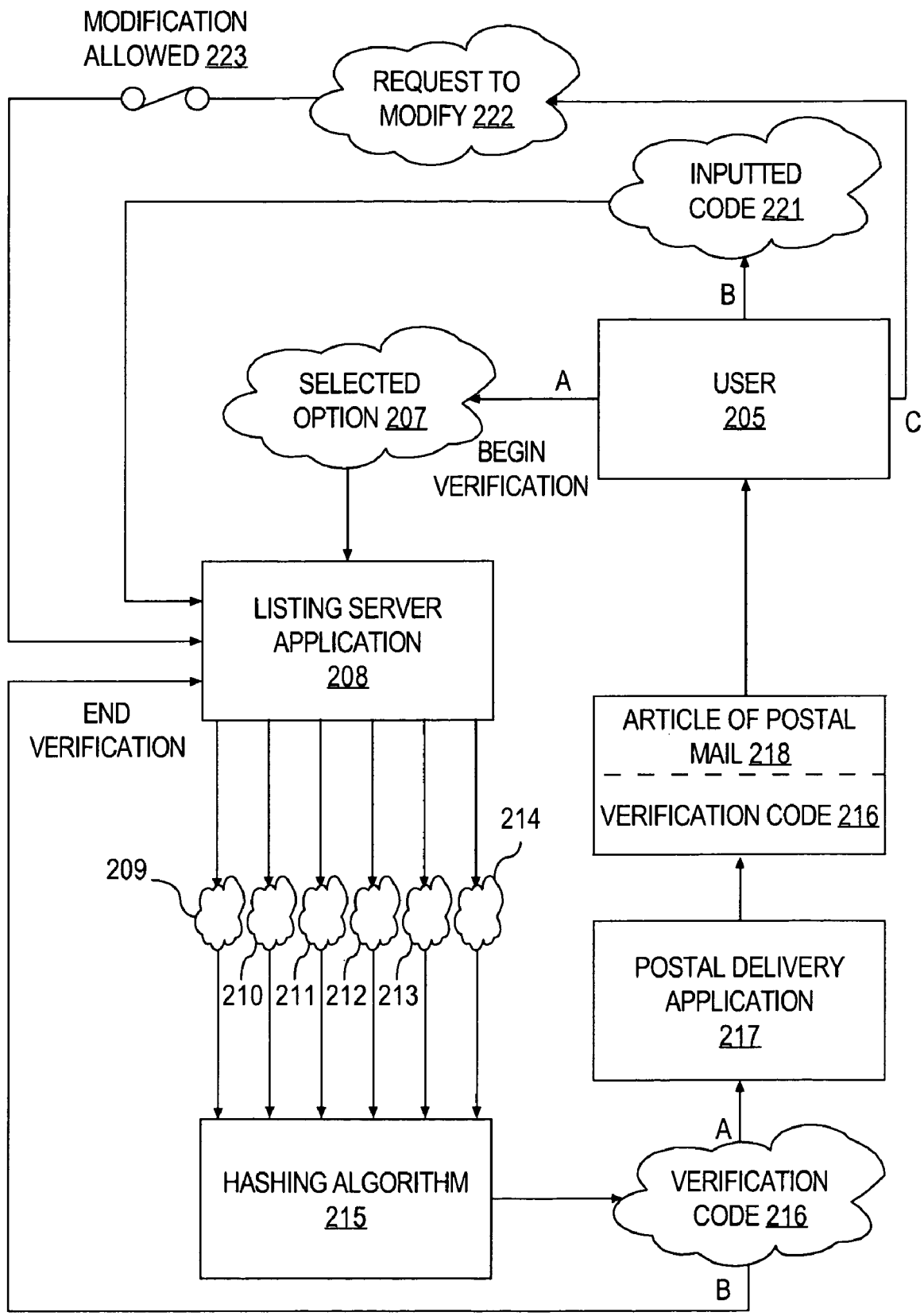
FIG. 2A is a diagram showing how a verification code is generated and delivered via postal mail, and thereafter a user's inputted code based on the postal mail is verified.
Figure 2B:
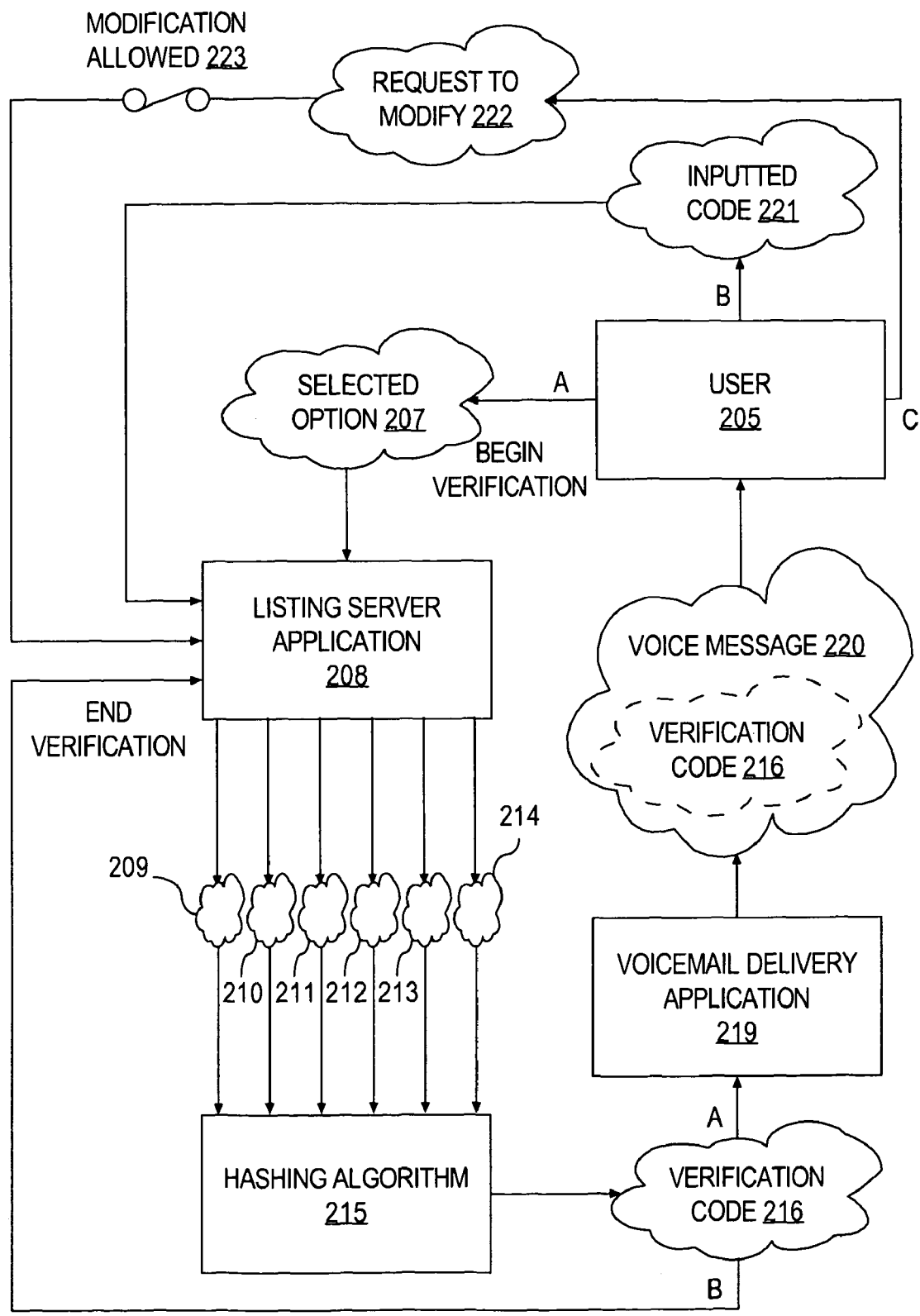
FIG. 2B is a diagram showing how a verification code is generated and delivered via voicemail, and thereafter a user's inputted code based on the voicemail is verified.

Referring to FIGS. 2a and 2b, user 205 can modify a listing in three steps, labeled and in the order of A, B, and C. For step A, when user 205 selects an option to claim ownership of the listing, user 205 sends the selected option 207 to a listing server application 208 of the online service provider. Selected option 207 indicates user 205 and the listing to which selected option 207 is associated. Selected option 207 may also indicate a delivery method requested for a verification code 216. For example, selected option 207 may indicate that user 205 wants to claim ownership of the listing by receiving verification code 216 via postal mail or voicemail. Steps B and C, concerning actions taken after delivery of verification code 216, are covered later.

User Identifier

User 205 is identified by a user identifier 209, and the listing is identified by a listing identifier 210. User identifier 209 may be a string of letters, numbers, or other characters. User identifier 209 may uniquely identify user 205, or user identifier 209 may be combined with a version number 211 to uniquely identify user 205.

The online service provider can use version numbers to handle recycled user identifiers. If a user abandons his or her user identifier, another user may later use user identifier. When the online service provider allows another user to use user identifier, the online service provider updates the version number to indicate that the first user of user identifier is no longer active. For example, the version number of "2" indicates that user 205 is the second user to use user identifier 209.

Listing Identifier

Listing identifier 210 uniquely identifies a listing. Listing identifier 210 may be a portion of the URL (Uniform Resource Locator) where the listing can be found, or listing identifier 210 may be a hidden value known only to the online service provider. Listing identifier 210 may be a string of letters, numbers, or other characters.

Verification Code Generation

Listing server application 208 combines listing identifier 210 with user identifier 209 to form the input, or message to a hashing algorithm 215. Listing server application 208 may also use version number 211, a verification code counter 212, a date 213, and a secret string 214 to form the input to hashing algorithm 215. Version number 211, verification code counter 212, and date 213 are stored in a user database. From the user database, verification code 216 can be regenerated when the user logs in to input code 221. The secret string is a secret global variable and does not need to be stored in the user database.

Verification code counter 212 represents the number of times verification code 216 has been sent for a particular listing. In another embodiment, verification code counter 212 represents the number of times user 205 has requested verification code 216 for the particular listing. In yet another embodiment, verification code counter 212 represents the number of times user 205 has requested verification code 216 in general.

Date 213 represents the date on which user 205 selects to claim ownership of the listing. Date 213 may also include a time. In another embodiment, date 213 represents the date on which verification code 216 is sent out to be delivered to the owner of the listing. Date may be any indication of time that can be associated with an action of either user 205 or the online service provider.

Secret string 214 represents a string known only to the online service provider. The same secret string 214 may be used every time listing server application 208 uses hashing algorithm 215 to generate verification code 216. For example, if user I claims listing X, then listing server application 208 uses secret string Q as an input to hashing algorithm 215. Other inputs include user identifier 209 for user I and the listing identifier 210 for listing X. Then, if user J claims listing Y, the listing server application 208 still uses secret string Q as an input to hashing algorithm 215. Other inputs include user identifier 209 for user J and the listing identifier 210 for listing Y. Secret string 214 may be a string of letters, numbers, or other characters.

The input, or message, to hashing algorithm 215 may be a concatenated combination of user identifier 209, listing identifier 210, version number 211, verification code counter 212, date 213, and secret string 214. Hashing algorithm 215 generates a hash value, or message digest. Hashing algorithm 215 may be any type of hashing algorithm. In one embodiment, a well-known hashing algorithm such as MD5 is used. In another embodiment, the hashing algorithm SHA1 is used. The message digest generated by hashing algorithm 215 is then used to create verification code 216. In one embodiment, verification code 216 represents the first 8 characters of the message digest. In another embodiment, verification code 216 represents characters 5 through 10 of the message digest. In one embodiment, verification code 216 is sent to listing server application 208 so that verification code 216 may be stored.

Determining How to Deliver the Verification Code

Depending on the type of contact requested for verification by user 205, the verification code could be sent to user 205 via postal mail or via voicemail. In FIG. 2a, verification code 216 is delivered to postal delivery application 217 during step A.

Figure 3:
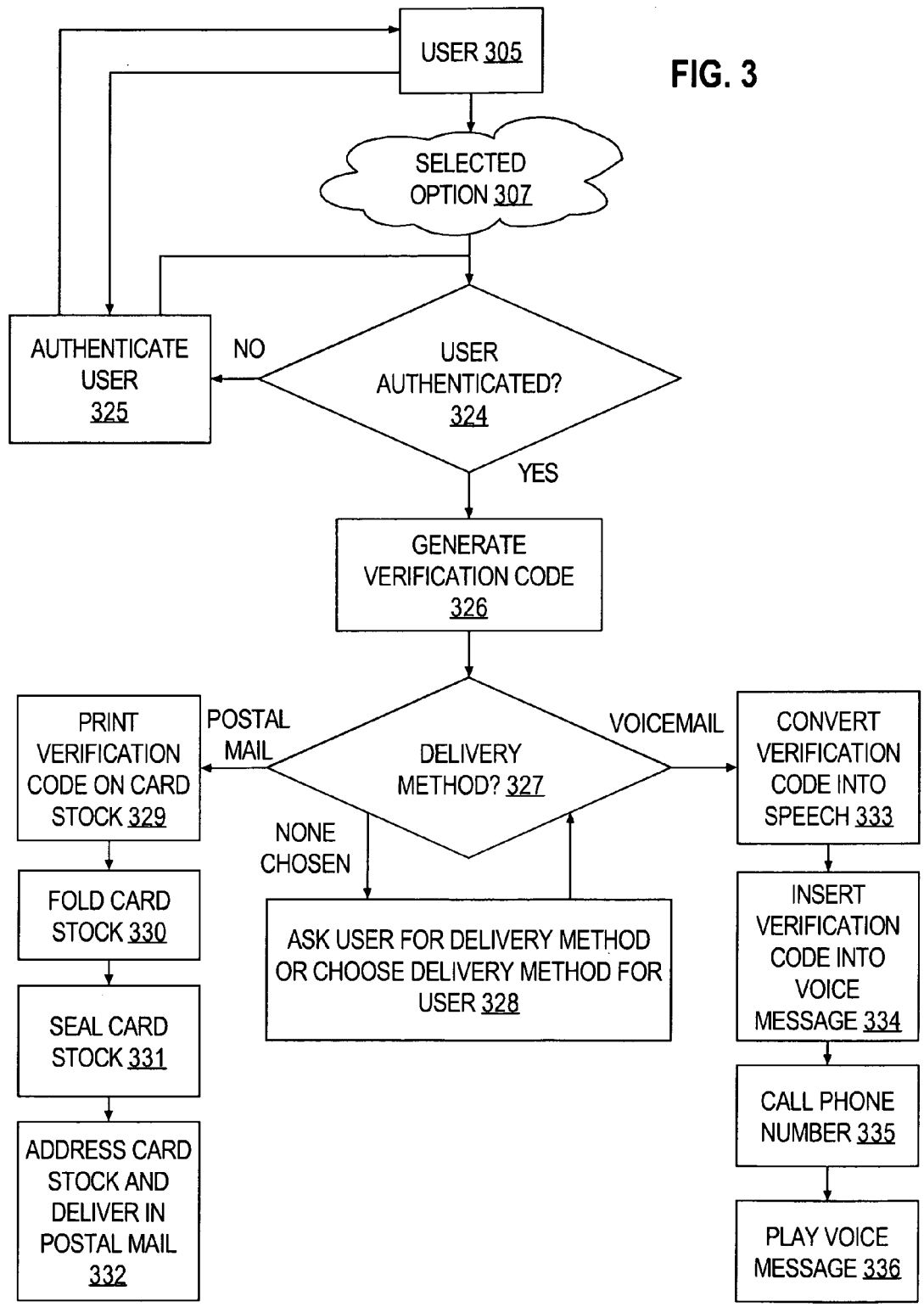
FIG. 3 is a decision model illustrating a method for determining how to deliver the verification code to the user.

In FIG. 2b, verification code 216 is delivered to voicemail delivery application 219 during step A. Referring now to FIG. 3, user 305 initially selects an option to claim ownership of a listing using a particular delivery method. In response to selected option 307, the listing server application determines whether user 305 is authenticated in step 324. If user 305 is not authenticated, then the listing server application authenticates user 305 in step 325 with a user identifier and a password. Once user 305 is authenticated, a verification code is generated in step 326 based on user identifier and a listing identifier for the listing.

The verification code is then delivered according to the delivery method selected by user 305 according to step 327. If user 205 did not select a delivery method when selecting to claim ownership of the listing, then user 205 is provided with an option to select either postal mail delivery or voicemail delivery in step 328. Alternately, in step 328 the listing server may select a delivery method for user 205 based on the contact information available in the listing.

Postal mail and voicemail are especially reliable methods of delivery for listings because the local phone company keeps customer contact information in the form of a phone number and address for each of the local phone company's customers. A phone number for a listing may be the phone number that the local phone company provided to the customer. The address for the listing may be the address at which the phone number is used. If the listing is a business listing, then the phone number is the phone number that the business uses to handle customer calls. The address is the address that the business uses to handle customers in person. The reliability of contact information in a listing comes from the purposes for which the contact information is provided and the purposes for which the contact information is used.

If the delivery method is postal mail, then the verification code is sent to postal delivery application 217 as shown in FIG. 2a. If the delivery method is voicemail, then the verification code is sent to voicemail delivery application 219 as shown in FIG. 2b. In another embodiment, the delivery method is text message. To deliver the verification code by text message, a text message containing the verification code could be sent to the phone number.

Delivery of Verification Code by Postal Mail

Referring to FIG. 2a, the verification code may be sent to postal delivery application 217. Postal delivery application 217 produces an article of postal mail 218 to be delivered to the address for the listing. If postal mail 218 at the address is controlled by user 205, then user 205 can be called the "owner of the listing." Otherwise, user 205 does not own or control at least part of the contact information in the listing. If user 205 is the owner of the listing, then user 205 will receive article of postal mail 218 delivered to the owner's address.

Article of postal mail 218 can be generated in a number of ways so that verification code 216 arrives at the address in the hands of the owner of the listing. In one embodiment, as shown in FIG. 3, the verification code is printed on a card stock in step 329. A message may also be printed on the card stock. At a minimum, the message identifies the verification code. The message may also identify the online service provider associated with the verification code, a URL (Uniform Resource Locator) for logging into the online service provider, and the user identifier. The version number, verification code counter, and date may be stored on the server and do not need to be included in the message. The secret string should not be printed on the card stock because the secret string should remain known only to the online service provider. In step 330, the card stock is then folded so that the verification code is concealed on the inner portion of the card stock. The card stock is then sealed in step 331 so that the verification code cannot be seen without first breaking the seal. In step 332, the address is printed on the outside of the card stock so that the card stock may be sent to the address via postal mail. To send the card stock to the address via postal mail, the card stock is dropped into a mailbox. From the mailbox, the card stock is transported to the post office, where the printed address is processed for delivery. Post office employees deliver the card stock to the address.

Delivery of Verification Code by Voicemail

Referring to FIG. 2b, verification code 216 may be sent to voicemail delivery application 219. Voicemail delivery application 219 produces a voice message 220 to be delivered to the phone number for the listing. If the voicemail for the phone number is controlled by user 205, then user 205 can be called the "owner of the listing." Otherwise, user 205 does not own or control at least part of the contact information in the listing. If user 205 is the owner of the listing, then user 205 will receive the voice message 220 delivered to the owner's phone number.

Voice message 220 can be generated in a number of ways so that voice message 220 with verification code 216 arrives in the voicemail of the owner of the listing. In one embodiment, as shown in FIG. 3, the verification code is converted from text into speech in step 333. The converted verification code is then inserted into a voice message in step 334. A sample voice message states, "Your [online service provider] verification code is [verification code]," where [online service provider] represents the name of the online service provider, and [verification code] represents the speech form of the verification code inserted into the message. In step 335, the voicemail delivery application then calls the phone number, and the message is played in step 336. The voicemail delivery application can wait for an answering machine or caller to pick up before playing the message in step 336.

Determining Whether User is Listing Owner

Returning to FIGS. 2a and 2b, in step B user 205 inputs code 221 from verification code 216 to listing server application 208. Listing server application 208 determines whether inputted code 221 matches verification code 216. Listing server application 208 makes this determination using either a stored version of verification code 216, or, as shown in FIGS. 2a and 2b, by generating a second verification code in the same manner that verification code 216 was generated in response to the selected option 207 in step A. Listing server application 208 compares either the stored version of verification code 216 or the second verification code matching verification code 216 with the inputted code 221. If the compared codes 216 and 221 are the same, then the listing server can verify that user 205 is the owner of the listing.

Figure 4:
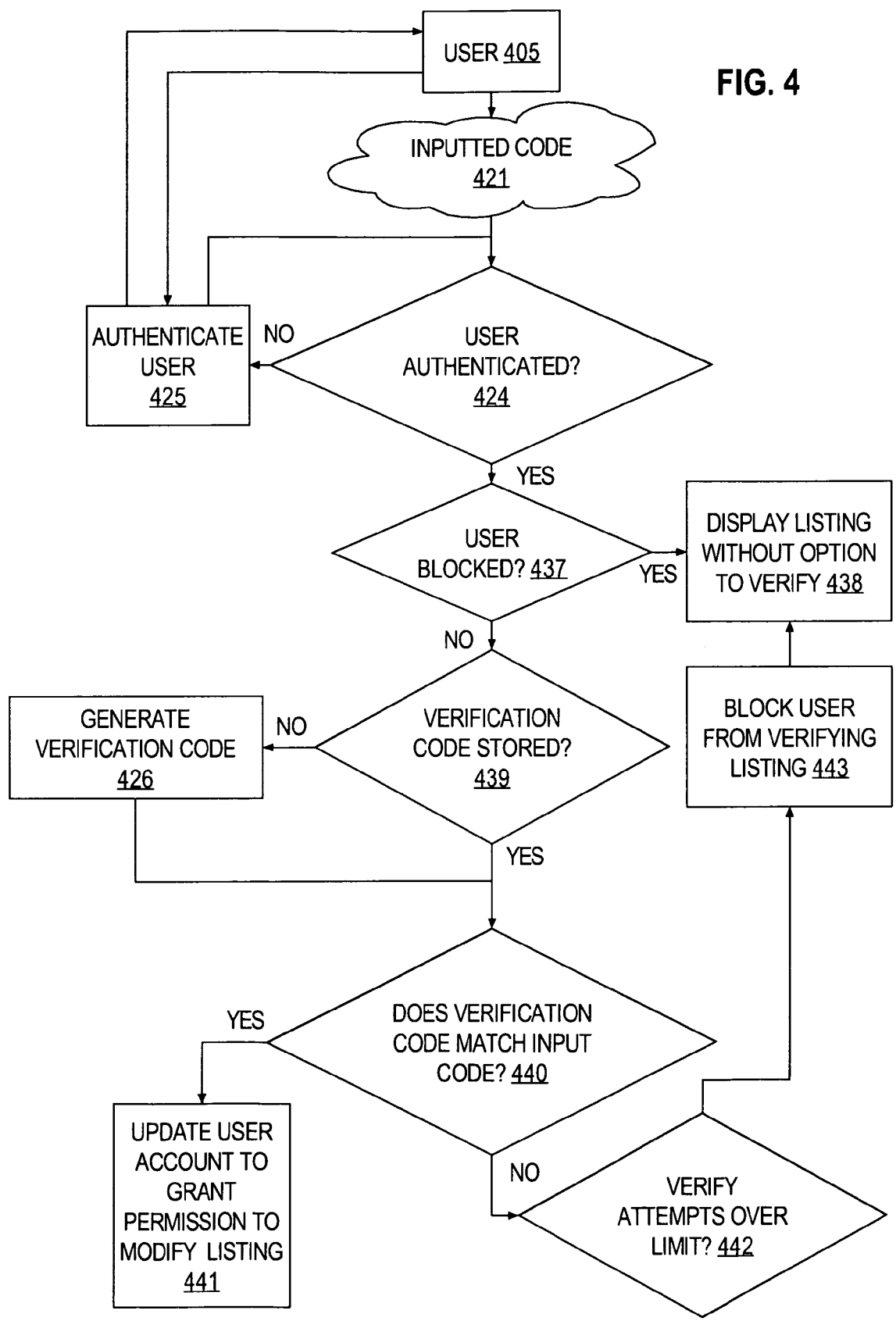
FIG. 4 is a decision model illustrating how to determine whether the user's inputted code matches the verification code.

Referring to FIG. 4, user 405 inputs a code to a listing server application in step 421. The listing server application determines whether user 405 is authenticated in step 424. If user 405 is authenticated, then the listing server application can determine the user identifier and the listing identifier that user 405 is attempting to verify. If user 405 is not authenticated, then the listing server application authenticates user 405 by requesting a user identifier and a password.

Authentication of user 405 provides an additional barrier to unauthorized users. Even if a user who does not own the listing gains access to the verification code generated by the owner, the user still cannot verify the listing unless that user generated the verification code. Therefore, if the owner of the listing generated the verification code, then the listing is protected by the owner's user authentication, regardless of whether the verification code is kept secret. If the verification code is generated by a fake user, then the fake user will not be able to gain access to the verification code, which is delivered to the owner.

User 405 may be blocked from verifying the listing if user 405 has attempted to verify listings in general unsuccessfully over a threshold number of times, or if user 405 has attempted to verify the particular listing unsuccessfully over a threshold number of times. If user 405 is blocked from verifying the listing, then the listing server application can display the listing without the option to verify the listing. If user 405 is not blocked, then the listing server application generates the second verification code in the same manner by which the verification code was generated in step 326 of FIG. 3.

In step 440, the listing server application determines whether the second verification code or the stored version of the verification code match the inputted code. If the compared codes match, then in step 441 the listing server application updates user account to grant user 405 permission to modify the listing. If the second verification code or the stored version of the verification code does not match the inputted code, then the listing server should determine in step 442 whether user 405 has entered the verification code incorrectly over a threshold number of times. If user 405 is not over the limit of attempts to enter the verification code, then user 405 is allowed to input the code another time in step 421. If user 405 is over the limit of attempts to enter the verification code, then user 405 is blocked from inputting the verification code in step 443. If user 405 is blocked, the listing server application displays the listing without an option to verify in step 438.

Allowing Modifications by Verified User

Referring back to FIGS. 2a and 2b, in step C the now verified user 205 requests to modify 222 the listing on listing server application 208. Listing server application 208 checks whether user 205 is a verified owner of the listing. In FIGS. 2a and 2b, listing server application 208 determines that user 205 is a verified owner of the listing because listing server application 208 received the correct inputted code 221 from user 205 in step B. Once verified, the ownership association between user 205 and the listing is stored in the user database indexed by user identifier 209.

Figure 5:
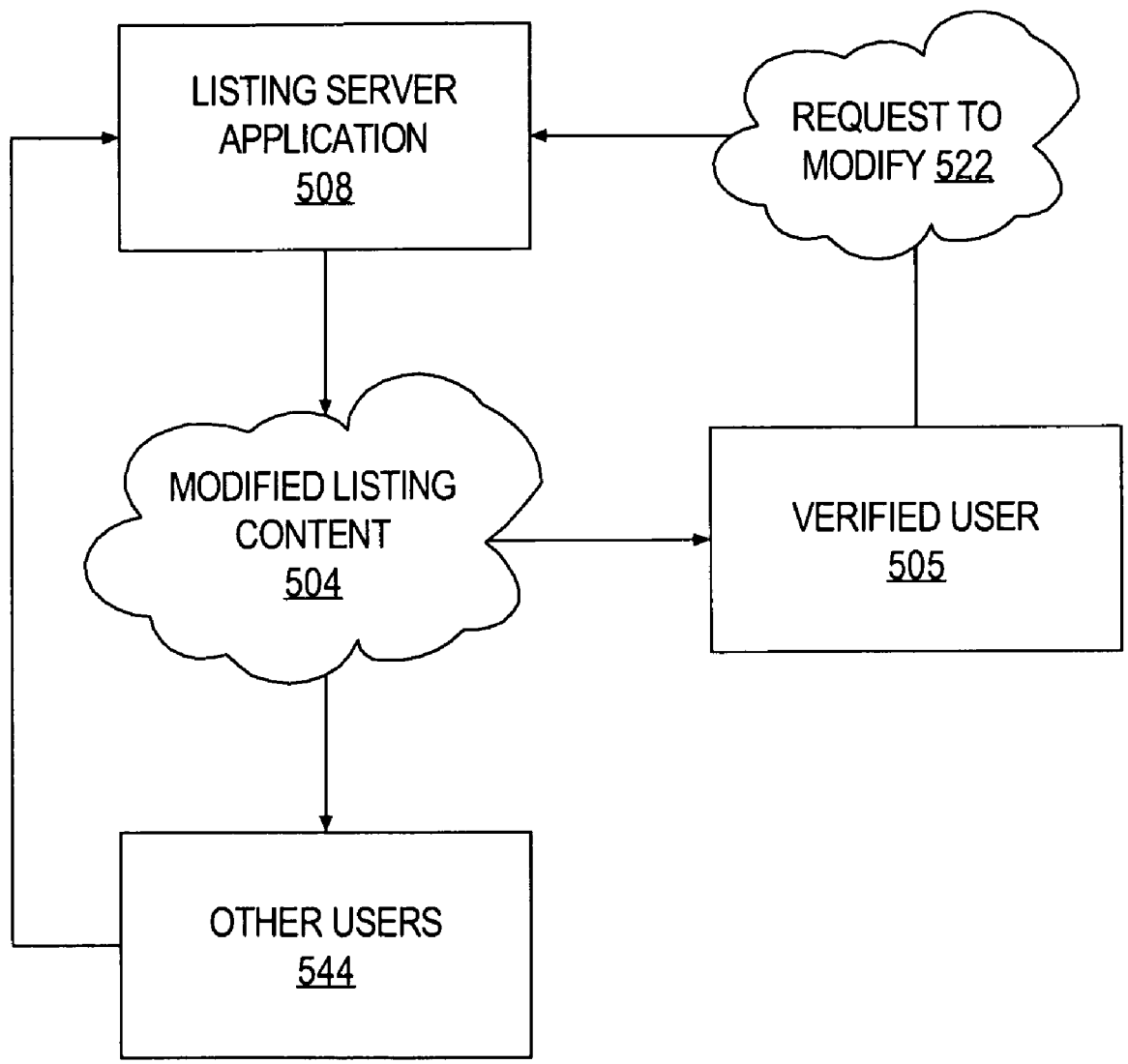
FIG. 5 is a diagram illustrating a verified user modifying a public listing.

FIG. 5 shows a simplified diagram representing a verified user 505 modifying listing content 504 for a listing on a listing server application 508. Listing content 504 is updated by listing server application 508 to reflect modifications made by verified user 505 after verified user 505 requests to modify 222 the listing. Other users 544 browse or search for listing content 504 on listing server application 508, and other users 544 see listing content 504 as modified by the verified user 505.

Blocking Modifications by Unverified User

Figure 6:
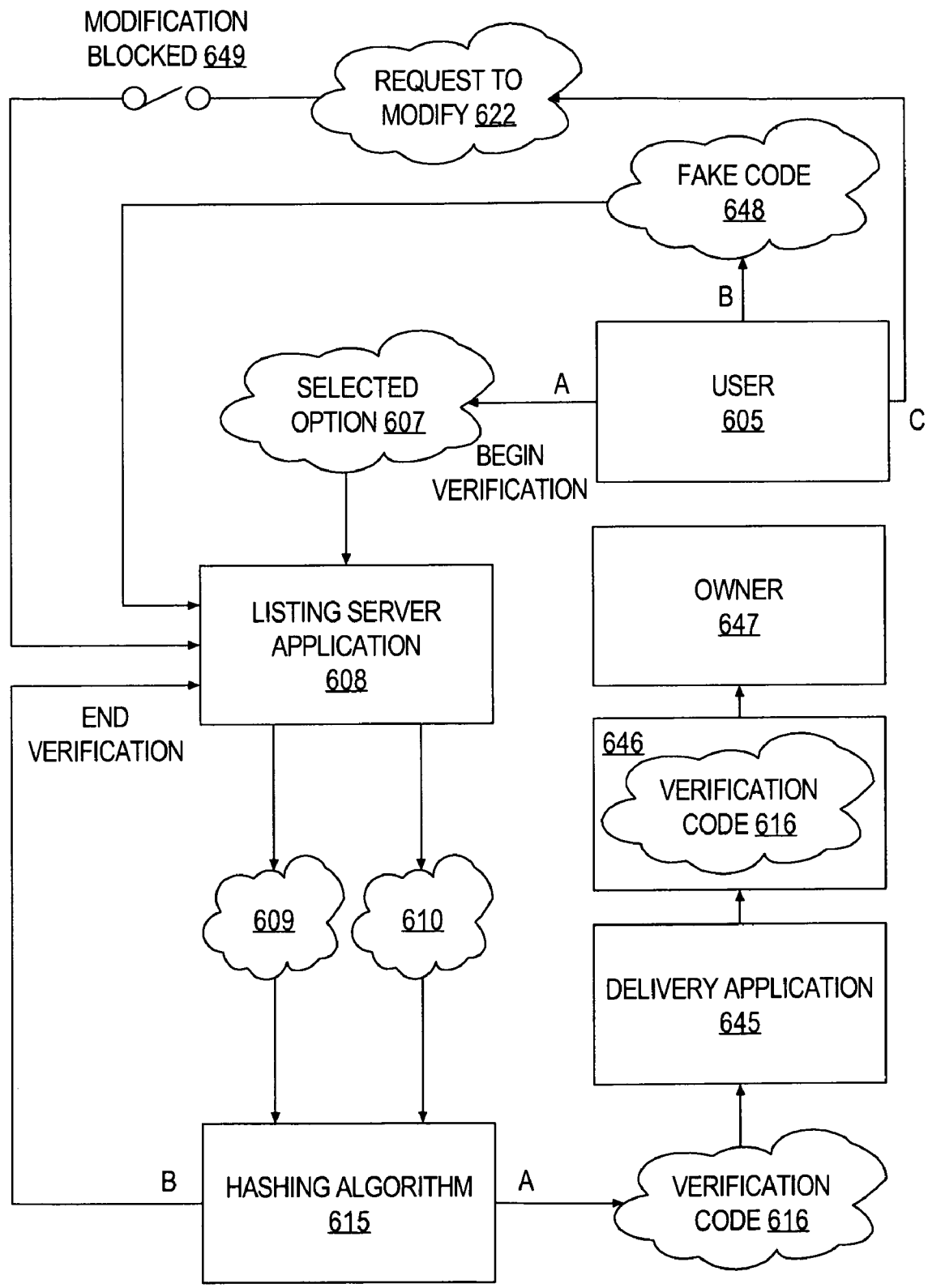
FIG. 6 is a diagram showing how a user who does not own a listing is blocked from modifying the listing.

FIG. 6 represents an attempt by a user 605 to modify a listing when user 605 does not own the listing. In step A, user 605 begins the verification process by selecting an option 607 to claim a listing on listing server application 608. Listing server application 608 sends a user identifier 609 for user 605 and a listing identifier 610 for the listing into hashing algorithm 615. Hashing algorithm 615 generates a verification code 616, which is sent to delivery application 645. Delivery application 645 delivers verification code 616 to owner 647 of the listing.

In FIG. 6, unlike in FIGS. 2a and 2b, user 605 is not owner 647 of the listing. Thus, verification code 616 gets delivered to someone other than user 605. In step B, user 605, not having verification code 616, sends a fake code 648 to listing server application 608. Listing server application 608 sends listing identifier 610 and user identifier 609 into hashing algorithm 615. Hashing algorithm 615 returns verification code 616 to listing server application 608. Listing server application 608 compares fake code 648 to verification code 616 and determines that fake code 648 does not match verification code 616. Listing server application 616 blocks 649 user 605 from modifying the listing.

In step C, user 605 requests to modify 622 the listing. User 605 is blocked 649 from modifying the listing because user 605 does not have permission to modify the listing. Therefore, the online service provider can assure owner 647 of the listing that the listing will only be modified by owner 647 of the listing and not an imposter such as user 605 in FIG. 6.

Hardware Overview

Figure 7:
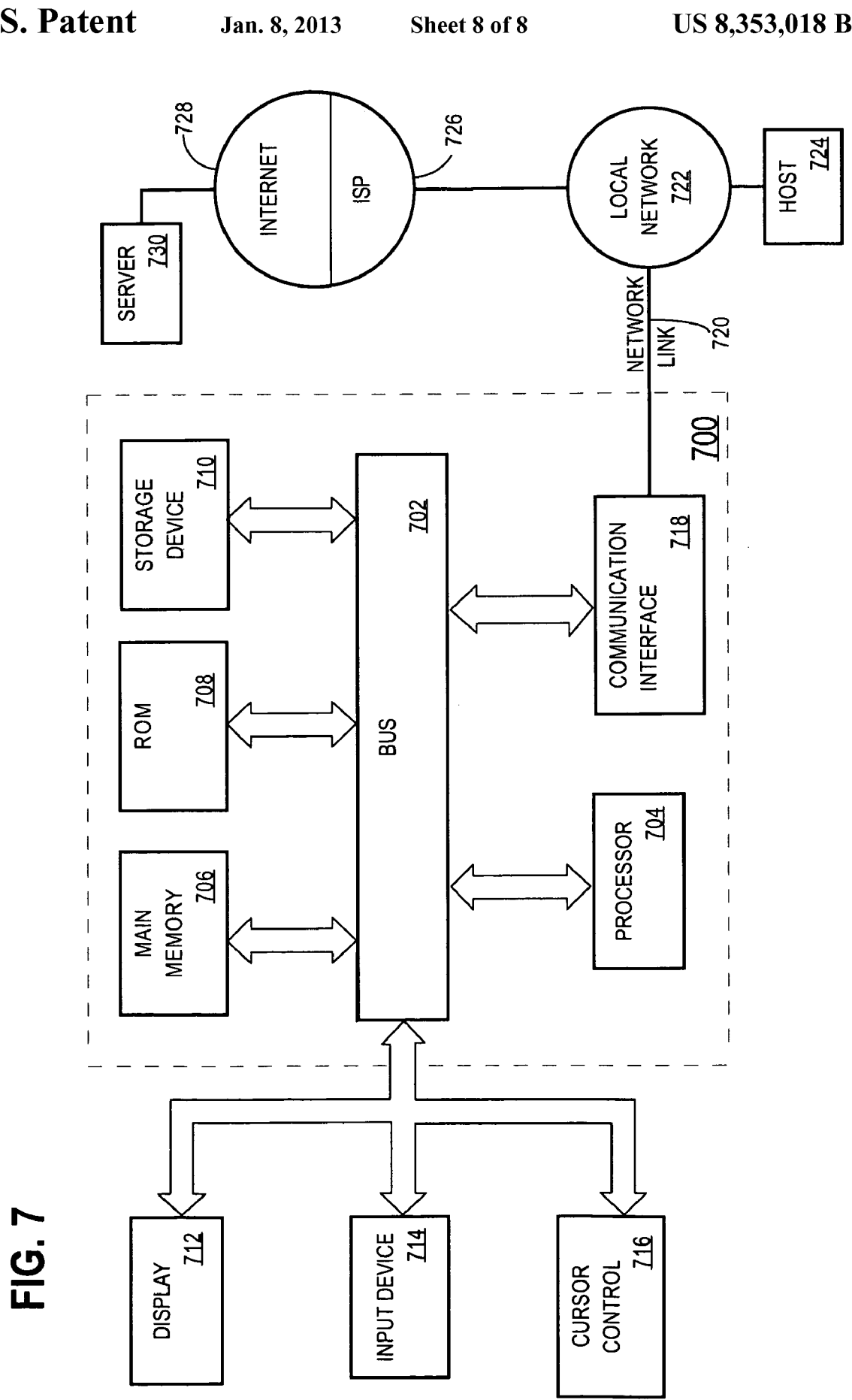
FIG. 7 is a diagram that illustrates a computer system that can be used to verify a user as the owner of a public listing.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    sending a listing, the listing comprising public contact information;
    sending an option to map the listing to a user account, the user account identified by a user identifier;
    receiving data indicating selection of the option to map the listing to the user account;
    generating a verification code from the user identifier and a listing identifier, the listing identified by the listing identifier;
    causing delivery of the verification code, wherein the delivery is made to a destination that is based on the public contact information;
    receiving an inputted code;
    determining whether the inputted code matches the verification code;
    mapping the user account to the listing in response to determining that the inputted code matches the verification code;
    wherein the method is performed by one or more computing devices.

2. The method of claim 1 wherein said public contact information comprises an address, and wherein causing delivery comprises printing the verification code and causing the verification code to be sent to the address via postal mail.

3. The method of claim 1 wherein causing delivery comprises printing the verification code on cardstock, further comprising folding the cardstock to conceal the verification code, and sealing the folded cardstock.

4. The method of claim 1 wherein said public contact information comprises a phone number, and wherein causing delivery comprises sending the verification code to the phone number via a text message.

5. The method of claim 1 wherein said public contact information comprises a phone number, and wherein causing delivery comprises converting the verification code to speech and sending the converted verification code to the phone number.

6. The method of claim 1 wherein said user identifier and a user password are received before said mapping the user account to the listing.

7. The method of claim 1 wherein sending the option comprises causing display of a button with the listing, the button causing said delivery of the verification code.

8. The method of claim 1 wherein said generating comprises using a hashing algorithm on a concatenation of the listing identifier and the user identifier.

9. The method of claim 1 wherein said generating is also based on a string not known to the public.

10. The method of claim 1 wherein said generating is also based on a version of the user identifier.

11. The method of claim 1 wherein said generating is also based on a counter that indicates a number of times that one or more verification codes have been sent in response to receiving the data indicating selection of the option.

12. The method of claim 1 wherein said generating is also based on a date on which said delivery occurs.

13. The method of claim 1 wherein said determining comprises generating the verification code based on a second user identifier and a second listing identifier, the second user identifier and the second listing identifier each determined upon said receiving an inputted code.

14. The method of claim 1 further comprising:
    after the mapping, receiving user input from a user of the user account that is mapped to the listing;
    in response to receiving the user input, modifying the listing based on the user input.

15. A non-transitory computer-readable medium storing one or more sequences of instructions which, when executed by one or more processors, cause the one or more processors to perform:
    sending a listing, the listing comprising public contact information;
    sending an option to map the listing to a user account, the user account identified by a user identifier;
    receiving data indicating selection of the option to map the listing to the user account;
    generating a verification code from the user identifier and a listing identifier, the listing identified by the listing identifier;
    causing delivery of the verification code, wherein the delivery is made to a destination that is based on the public contact information;
    receiving an inputted code;
    determining whether the inputted code matches the verification code;
    mapping the user account to the listing in response to determining that the inputted code matches the verification code.

16. The non-transitory computer-readable medium of claim 15,
    wherein said public contact information comprises an address, and wherein the instructions, when executed, cause delivery at least in part by printing the verification code and causing the verification code to be sent to the address via postal mail.

17. The non-transitory computer-readable medium of claim 15,
    wherein the instructions, when executed, cause delivery at least in part by printing the verification code on cardstock, folding the cardstock to conceal the verification code, and sealing the folded cardstock.

18. The non-transitory computer-readable medium of claim 15, wherein said public contact information comprises a phone number, and wherein the instructions, when executed, cause delivery at least in part by sending the verification code to the phone number via a text message.

19. The non-transitory computer-readable medium of claim 15, wherein said public contact information comprises a phone number, and wherein the instructions, when executed, cause delivery at least in part by converting the verification code to speech and sending the converted verification code to the phone number.

20. The non-transitory computer-readable medium of claim 15, wherein said user identifier and a user password are received before said mapping the user account to the listing.

21. The non-transitory computer-readable medium of claim 15, wherein the instructions, when executed, cause sending the option at least in part by causing display of a button with the listing, the button causing said delivery of the verification code.

22. The non-transitory computer-readable medium of claim 15, wherein the instructions, when executed, cause said generating at least in part by using a hashing algorithm on a concatenation of the listing identifier and the user identifier.

23. The non-transitory computer-readable medium of claim 15, wherein said generating also based on a string not known to the public.

24. The non-transitory computer-readable medium of claim 15, wherein said generating is also based on a version of the user identifier.

25. The non-transitory computer-readable medium of claim 15, wherein said generating is also based on a counter that indicates a number of times that one or more verification codes have been sent in response to receiving the data indicating selection of the option.

26. The non-transitory computer-readable medium of claim 15, wherein said generating is also based on a date on which said delivery occurs.

27. The non-transitory computer-readable medium of claim 15, wherein the instructions, when executed, cause determining at least in part by generating the verification code based on a second user identifier and a second listing identifier, the second user identifier and the second listing identifier each determined upon said receiving an inputted code.

28. The non-transitory computer-readable medium of claim 15, wherein the instructions, when executed, cause, after the mapping, receiving user input from a user of the user account that is mapped to the listing; and in response to receiving the user input, modifying the listing based on the user input.

* * * * *